US011351902B2

(12) United States Patent
Benliyan et al.

(10) Patent No.: US 11,351,902 B2
(45) Date of Patent: Jun. 7, 2022

(54) HOLDING DEVICE FOR USE IN A MOTOR VEHICLE, METHOD FOR OPERATING A HOLDING DEVICE, CONTROL UNIT AND MOTOR VEHICLE

(71) Applicant: AUDI AG, Ingolstadt (DE)

(72) Inventors: Sarkis Benliyan, Ingolstadt (DE); Torsten Gallitzdorfer, Riesa (DE); Christian Becker, Ingolstadt (DE); Maximilian Fischhaber, Munich (DE); Bartos Scharmach, Munich (DE); Adis Ragipovic, Ingolstadt (DE); Andreas Richter, Gaimersheim (DE); Sven Michaelis, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 325 days.

(21) Appl. No.: 16/624,460

(22) PCT Filed: Jun. 19, 2018

(86) PCT No.: PCT/EP2018/066184
§ 371 (c)(1),
(2) Date: Dec. 19, 2019

(87) PCT Pub. No.: WO2018/234271
PCT Pub. Date: Dec. 27, 2018

(65) Prior Publication Data
US 2020/0180490 A1    Jun. 11, 2020

(30) Foreign Application Priority Data

Jun. 23, 2017 (DE) .......................... 102017210640.9

(51) Int. Cl.
*F16M 11/00*    (2006.01)
*B60N 3/10*    (2006.01)
(Continued)

(52) U.S. Cl.
CPC ............. *B60N 3/106* (2013.01); *B60N 3/104* (2013.01); *B60N 2/002* (2013.01); *B60N 2002/0268* (2013.01)

(58) Field of Classification Search
CPC ......... B60N 3/106; B60N 3/104; B60R 11/00; B60R 3/105
See application file for complete search history.

(56) References Cited

U.S. PATENT DOCUMENTS 2,973,601 A * 3/1961 McKnight ................ A47K 5/02
206/77.1
4,485,919 A * 12/1984 Sandel ...................... A61L 2/26
206/370
(Continued)

FOREIGN PATENT DOCUMENTS

CN    205661347 U    10/2016
CN    205997750 U    3/2017
(Continued)

OTHER PUBLICATIONS

Office Action dated Jul. 27, 2021 in corresponding Chinese Application No. 201880041609.X; 17 pages including English-language translation.
(Continued)

*Primary Examiner* — Amy J. Sterling
(74) *Attorney, Agent, or Firm* — Maier & Maier, PLLC

(57) ABSTRACT

A holding device for a motor vehicle, includes at least one rod element, which has a first end with a cross-sectional surface, which forms a part of a holding surface of the holding device. A main extension axis of the at least one rod element intersects the part of the holding surface such that a second end, opposite the first end, of the at least one rod element is facing away from the part of the holding surface and protrudes into the holding device, and an adjustment (Continued)

device for adjusting the at least one rod element along the main extension direction.

15 Claims, 3 Drawing Sheets

(51) Int. Cl.
  *B60N 2/00* (2006.01)
  *B60N 2/02* (2006.01)

(56) References Cited

U.S. PATENT DOCUMENTS

| | | | |
|---|---|---|---|
| 6,843,458 B1* | 1/2005 | Robinson | A47G 23/0216 248/311.2 |
| 9,358,930 B1* | 6/2016 | Sic | B60R 7/06 |
| 10,213,913 B2* | 2/2019 | Pang | B25H 3/06 |
| 11,214,201 B2* | 1/2022 | Bhakta | B60R 7/04 |
| 2002/0007852 A1 | 1/2002 | Glovatsky et al. | |
| 2002/0008127 A1 | 1/2002 | Glovatsky et al. | |
| 2002/0070324 A1 | 6/2002 | Huang | |
| 2012/0091744 A1 | 4/2012 | McKnight et al. | |

FOREIGN PATENT DOCUMENTS

| | | |
|---|---|---|
| DE | 10 2011 115562 A1 | 4/2012 |
| DE | 10 2013 225670 A1 | 6/2015 |
| EP | 1803608 A1 | 7/2007 |
| EP | 3 647 119 A1 | 5/2020 |
| JP | 2000-203348 A | 7/2000 |
| JP | 2005-289351 A | 10/2005 |
| KR | 970026372 A | 6/1997 |
| KR | 10-2002-0082607 A | 10/2002 |
| KR | 20050101449 A | 10/2005 |

OTHER PUBLICATIONS

International Search Report dated Oct. 25, 2018 and Written Opinion in corresponding International Application No. PCT/EP2018/066184; 19 pages; Machine translation attached.
International Preliminary Report on Patentability dated Jun. 3, 2019 in corresponding International Application No. PCT/EP2018/066184; 30 pages; Machine translation attached.
Examination Report dated Apr. 15, 2021 in corresponding German Application No. 10 2017 210 640.9; 13 pages including English-language translation.
English-language translation of the International Preliminary Report on Patentability dated Dec. 26, 2019 in corresponding International Application No. PCT/EP2018/066184; 7 pages.

* cited by examiner

HOLDING DEVICE FOR USE IN A MOTOR VEHICLE, METHOD FOR OPERATING A HOLDING DEVICE, CONTROL UNIT AND MOTOR VEHICLE

FIELD

The invention relates to a holding device for a motor vehicle, which may also be characterized, for example, as a retaining device. The invention likewise relates to a method for operating a holding device.

BACKGROUND

Holding and/or retaining devices, for example cup holders, are permanently installed at a predefined location in the motor vehicle. There are different designs, with which, for example, cups, mugs, or other objects can be retained and attached in the vehicle.

The location for holding things is also permanently defined in vehicles and does not allow for any customized holding or other, additional interactions. Exemplary holding devices of a motor vehicle are cradles for mobile terminals in the middle console or cup holders. Such holding devices cannot respond to particular, unforeseen situations, for example when a driver wishes to place his/her cup in a position that is more comfortable for the driver. Today's permanently installed holding cradles or cup holders thus cannot be adapted autonomously or independently to new requirements.

Due to a universal size or form, other objects or, for example, particular models of cups or mobile telephones are difficult to integrate; thus, they do not fit perfectly into the retainer. For example, a new contour of paper cup or cups with a handle or oversized mobile devices are difficult or nearly impossible to place. When the fit is insufficient, i.e. not perfect, there is the risk that, for example, liquids will spill or objects will fall down or out. In some circumstances, an occupant of the motor vehicle will be disturbed and, in some circumstances, driving safety affected.

In addition, predefined, rigid holding places frequently appear optically as a black or gray hole, usually according to the application thereof, and are thus unattractive. In a future vehicle interior of a motor vehicle 10, wherein, for example, piloted driving appears to be commonplace, users or a user can individually use the interior, for example as a living room. This means fewer limitations, maximum mobility, freedom, and self-determination.

An object upon which the invention is based is the improvement of driving safety in the motor vehicle.

SUMMARY

The presented object is achieved by the devices according to the invention and the method according to the invention in accordance with the ancillary claims. Advantageous refinements are indicated by the dependent claims.

The invention is based on the idea of providing a holding device for a motor vehicle, which has at least one rod element adjustable in its main extension axis, preferably a plurality of such rod elements. A surface of a first end of the at least one rod element, which may also be characterized as a front side or cross-sectional surface, forms a part of the surface of the holding device in this case as a function of the object to be placed, through adjustment of the at least one rod element. A totality of such cross-sectional surfaces then forms a holding element, which has a fitted shape and lies in a beneficial position of the holding device. The aforementioned disadvantages are thereby reduced or even completely eliminated and thus driving safety increases.

The holding device according to the invention for a motor vehicle may be designed, for example, as part of an interior trim element of the motor vehicle or form the interior trim element, wherein the interior trim element may be, for example, a center console or a dashboard or an armrest. The holding device according to the invention is characterized by at least one rod element, i.e. at least one longitudinal element with a predominantly straight body, the length of which is greater than its remaining dimensions and the resulting cross-sectional surface. The rod element may be designed, for example, as a pin or rod. The at least one rod element has a first end with a cross-sectional surface as the end face, wherein the cross-sectional surface may also be characterized, for example, as an end face or front side of the contact surface. The cross-sectional surface of the first end forms a part of a holding surface of the holding device.

A main extension axis of the at least one rod element intersects the cross-sectional surface of the first end and thus of the holding surface such that a second end, opposite the first end, of the at least one rod element is facing away from the holding surface and protrudes into the holding device.

The holding device additionally has an adjustment device for adjusting the at least one rod element along the main extension direction of the at least one rod element. In other words, the at least one rod element can be shifted out of the holding device or into the holding device.

A non-stationary holding and retaining system is provided by the holding device according to the invention. The holding device according to the invention has a very high degree of flexibility, which is expressed, inter alia, in that a form of the holding device at the holding location can be adapted to the requirements and any physical changes of the user. In addition, an adaptation of the holding or retaining surface, i.e. of the holding element, to different objects or items is possible with respect to the form and design.

This results in the aforementioned advantages, and the previously described disadvantages are reduced or even eliminated. The holding surface can change its form due to the adjustability of the at least one rod element such that a holding element of the holding device can be formed with a desired form. In other words, the holding device enables one holding element or several holding elements with modifiable forms and positions in the holding device and thus fitted retaining of the object. Due to this modifiable size and/or form, different objects can be mounted and retained very well, for example including cups with handles or oversized mobile terminals or any type of other objects, for example a key ring or wallet. Due to the adapted form, the object is mounted very well and thus retained very well such that, for example, spilling of liquids is effectively prevented. Due to the variable fit, the risk of objects falling out or objects shifting is reduced in the interior such that driving safety is increased significantly. If the holding device has several rod elements, holding elements can thereby be formed at various positions of the holding device. For this reason, the object can be mounted at the optimum distance of a user of the motor vehicle even if the user, for example, does not have long arms or long fingers or has adjusted the vehicle seat very far rearward due to longer legs.

According to a preferred embodiment of the holding device according to the invention, it may have an output device, i.e. a device or a device component or a component for displaying a screen content and for outputting light, said output device possibly being designed, for example, as a screen and/or light. The output device may preferably be designed as a display and/or lighting device, i.e. as a component for outputting a screen content and/or light. The output device may have, for example, at least one output element and/or at least one lighting element, which may be arranged in and/or on the cross-sectional surface of the first end of the at least one rod element. For example, each of the rod elements may have a screen on the first end as the output element.

Such a holding device can respond autonomously and independently to new requirements. For example, new settings can be carried out on-site; for example, the exemplary screen of the at least one rod element or a totality of screens of several rod elements can generate a light signal or displayed content, for example information such as "Now perfect for drinking," or the rod elements forming the holding element can show the user where the user can place the object, for example by means of lighting a bulb or light-emitting diode (LED) or organic LED (OLED). In other words, such a holding device is not only used as a retainer but also as an interaction tool or means for generating a warning. In other words, in addition to the holding and retaining function, additional functions can be adopted, for example an interaction and display surface function. These cross-sectional surfaces may additionally ensure a very decorative look, for example, by installing digital graphics, for example, on several rod elements, the output device of which may have, for example, a screen for each.

According to an especially preferred embodiment of the holding device according to the invention, it is characterized in that it has a plurality of rod elements, wherein each of the rod elements is arranged to be adjustable along its respective main extension axis, and wherein the respective cross-sectional surfaces form the part of the holding surface of the holding device. In this process, the adjustment device may be configured to adjust a part or each of the rod elements, preferably to adjust each of the rod elements independently of the other rod elements.

With such a holding device, holding elements can be formed at various positions such that different physical circumstances of the user or sitting positions of different users can be addressed especially advantageously. In addition, the holding element can be placed in a different position, while the object is mounted in the holding element or thereby retained such that the object can be moved from a first position into a further position. For example, an object can thus be moved closer to a hand of the user or the object may be moved, for example, upon a change in the sitting position, into a position that is more beneficial for the new sitting position.

The holding device may optionally have a damping device for damping a force applied to the at least one rod element, wherein the damping device is considered to be a component or assembly for damping jolts. To this end, the damping device may have, for example, a spring mechanism and at least partially absorb an application of force onto the at least one rod element for damping the application of force and/or a jolting of the motor vehicle during a drive. The object mounted in the holding device can thereby be better retained. With a strong jolt for example, undesirable vibrations can be absorbed and an escaping of liquids from the object or damage to the object can be reduced or even completely prevented.

A better hold is likewise enabled by an optimum suction device of the holding device, wherein the suction device is designed to generate a vacuum on the holding surface. To this end, a vacuum can be created, for example, between several rod elements by means of a pump in order to thusly retain the object on the holding surface. The at least one rod element may alternatively or additionally be designed as hollow, and the vacuum can be created within the rod element such that the at least one rod element can suction the object.

Preferably, the holding device may have a temperature-measuring device and/or a temperature-control element for heating and/or cooling of the at least one rod element and/or of the first end of the at least one rod element, which may be designed, for example, as a Peltier element. In this process, the temperature-measuring device and/or the temperature-control element may preferably be arranged in and/or on the at least one rod element. The exemplary Peltier element can thus be installed, for example, in the first end of the at least one rod element.

In addition to the holding and retaining function, other additional functions can be adopted by means of this embodiment. In conjunction with an output device, an additional function can be provided for information regarding, for example, a property of a liquid in the object. For example, if the holding device has the temperature-measuring device, which may have, for example, a thermometer in the at least one rod element, the liquid can be color-coded, for example, as a function of a recorded temperature in order to clearly indicate the state of the liquid, either accurately, for example, by displaying an absolute value, for example, of 22° C. in the display or abstractly, for example, as a rod element lit up in red.

Advantageously, the temperature of a placed object, for example a cup with a liquid, can additionally be controlled such that, for example, the liquid does not become cold or such that, for example, a very hot liquid is cooled such that the user does not burn a hand when drinking. This also increases driving safety significantly.

The previously presented object is likewise achieved by means of the method according to the invention for operating an embodiment of the holding device according to the invention of an interior trim element of the motor vehicle while achieving the previously mentioned advantages. The control unit executes the following steps. The control unit in this case is understood to be a device or a device component for receiving and evaluating signals as well as for generating control signals. The control unit may be designed, for example, as a control board or control device.

A form of an object that is situated in an interior of the motor vehicle is initially determined. For example, a scanner device of the motor vehicle can scan a user of the motor vehicle upon entry into the motor vehicle and, in doing so, determine what objects the user is carrying. Using image processing software for example, the type of object or form of object can be determined by means of pattern detection. Alternatively, the user can input that he/she would like to set down a cup, for example, via an infotainment system of the motor vehicle. The form can be determined by means of a corresponding user input.

In addition, a position of the object that is suitable for holding the object is determined.

A holding surface form default signal, which describes an adjusting of the at least one rod element of the holding device along its main extension axis, is generated as a function of the determined form of the object and the determined position.

The generated holding surface form default signal is transferred to the adjustment device of the holding device in order to adjust the at least one rod element, and thereby the holding element is formed such that the part of the holding surface formed by a totality of cross-sectional surfaces forms a holding element at least partially fitted to the determined form, in the determined position. In the example with the cup as the object, the holding area form default signal can coordinate, for example, a plurality of rod elements such that the holding element formed by the rod elements can be designed fitted, for example, to a lower part of the cup.

Preferably, a sensor signal from a sensor device can be received by the control unit, wherein the sensor signal can describe the object. A sensor device is understood to be a device or a device component for recording physical, chemical, or other properties of objects and may comprise, for example, at least one sensor. The sensor device may have, for example, a sensor formed as a scanner or x-ray scanner or camera. This embodiment of the method according to the invention enables automatic adapting of the holding element of the holding device without the user of the motor vehicle having to program, for example, what object the user wishes to place.

According to an especially user-friendly embodiment of the method according to the invention, the control unit can determine a defining of a biometric parameter of a user and/or a sitting position of the user of the motor vehicle, for example by retrieving data that may describe, for example, a body size or an arm length and may be provided to a user account, for example, after the user of the motor vehicle logs in. Alternatively, a sensor at a vehicle seat, for example, may record the position of the vehicle seat or the position into which the vehicle seat is moved. By means of such information, the control unit can determine, for example, whether the user is now sitting further away from a previously placed object than before. The position on the holding device that is suitable for holding the object can then be determined as a function of the determined biometric parameter of the user.

According to a further embodiment of the method according to the invention, the control unit can execute a determining of a position or location change of a body of the user, for example with the assistance of a sensor of a motor vehicle seat or a camera. The control unit can likewise execute a determining of a current position of the holding element. As a function of the determined position or location change, an alternative position of the holding element can be determined, in which the object mounted in the holding element is more easily accessible from the changed body position and/or body location, and a further holding surface form default signal can be generated, which can describe an adjusting of a plurality of rod elements in order to move the holding element from the current position into the determined alternative position. Subsequently, the control unit can execute a transfer of the further holding surface form default signal to the adjustment device. The mounted object can hereby be moved, for example, closer to the user upon a change in the body position of the user without the user having to take the object and move it closer. This also results in increased driving safety because the user does not have to worry with the repositioning of the object or does not have to bend far forward, for example, the next time the user wishes to have the object.

According to a further embodiment of the method according to the invention, the control unit can execute a defining of a target value of a temperature of content of the object as well as a setting of the predefined target value by means of the temperature-control element of the holding device. Preferably, the defining of the target value in this case may depend on a determined material of the object and/or a property of the determined object. The previously mentioned advantages also result.

In order to determine the material of the object, information regarding the object can be retrieved from the Internet, via an Internet or mobile phone connection, for example, over the course of determining the object, wherein this information may describe, for example, whether this object is produced, for example, from a heat-conducting material or not. An exemplary property may be, for example, a design as a cup or a determining of a liquid in the exemplary cup. For example, information that the user likes to drink a coffee at a certain time can be stored in a user profile of the user of the motor vehicle. If there is navigation data, for example, which describes a current location of the motor vehicle at a café or a beverage business, it can be derived therefrom, for example, that when a cup is determined in the motor vehicle, there is very probably a hot liquid therein, for example. The temperature control can then be provided, for example, to heat the object to a target value or to cool down the object to a target value such that the liquid in the object is not too hot. The advantage of increased user comfort can hereby result or, however, even increased driving safety in the example of the reducing of a risk that the user will be burned by the liquid in the object when driving.

A lighting signal, which can describe a lighting of the holding element, can be generated as a function of the determined suitable position on the holding device and/or of a position of the holding element. The generated lighting signal can be transferred to the output device of the holding device for a) controlling the output and/or lighting element of the at least one rod element, i.e. for controlling a screen of the at least one rod element for example; and/or b) controlling the lighting element that impacts the at least one rod element with light. The user can thus much more quickly determine the site of the holding device at which the holding element was formed or will be formed both in darkness and in daylight, and the user does not have to search a long time, for example under poor light conditions or extensive light contrasts, for the particular site at which the user can place the object. Driving safety is also hereby increased, because the user does not have to pay a lot of attention to searching for the holding element.

The aforementioned object is achieved, with achievement of the previously mentioned advantages, by means of an embodiment of a control unit according to the invention, which is configured to execute method steps related to a control unit according to one of the previously described embodiments of the method according to the invention. The control unit may preferably have a processor device, i.e. a device for electronic data processing, which may preferably have at least one microcontroller and/or at least one microprocessor. The optional processor device can be configured to execute a program code stored in a data memory, wherein the program code is configured, upon execution by the processor device, to prompt the control unit to execute method steps related to a control unit. The control unit according to the invention can be presented, for example, as a controt board of the holding device or as a control unit of the motor vehicle.

The aforementioned object is achieved by means of a holding device according to the invention in accordance with one of the previously described embodiments, which is characterized by an embodiment of the control unit according to the invention.

The aforementioned object is achieved by means of a motor vehicle, which may be designed, for example, as a car, for example as a passenger car. The motor vehicle is characterized by an embodiment of the control unit according to the invention and/or an embodiment of the holding device according to the invention.

BRIEF DESCRIPTION OF THE DRAWING

Exemplary embodiments of the invention are described in the following. The following is shown.

DETAILED DESCRIPTION

Figure 1:
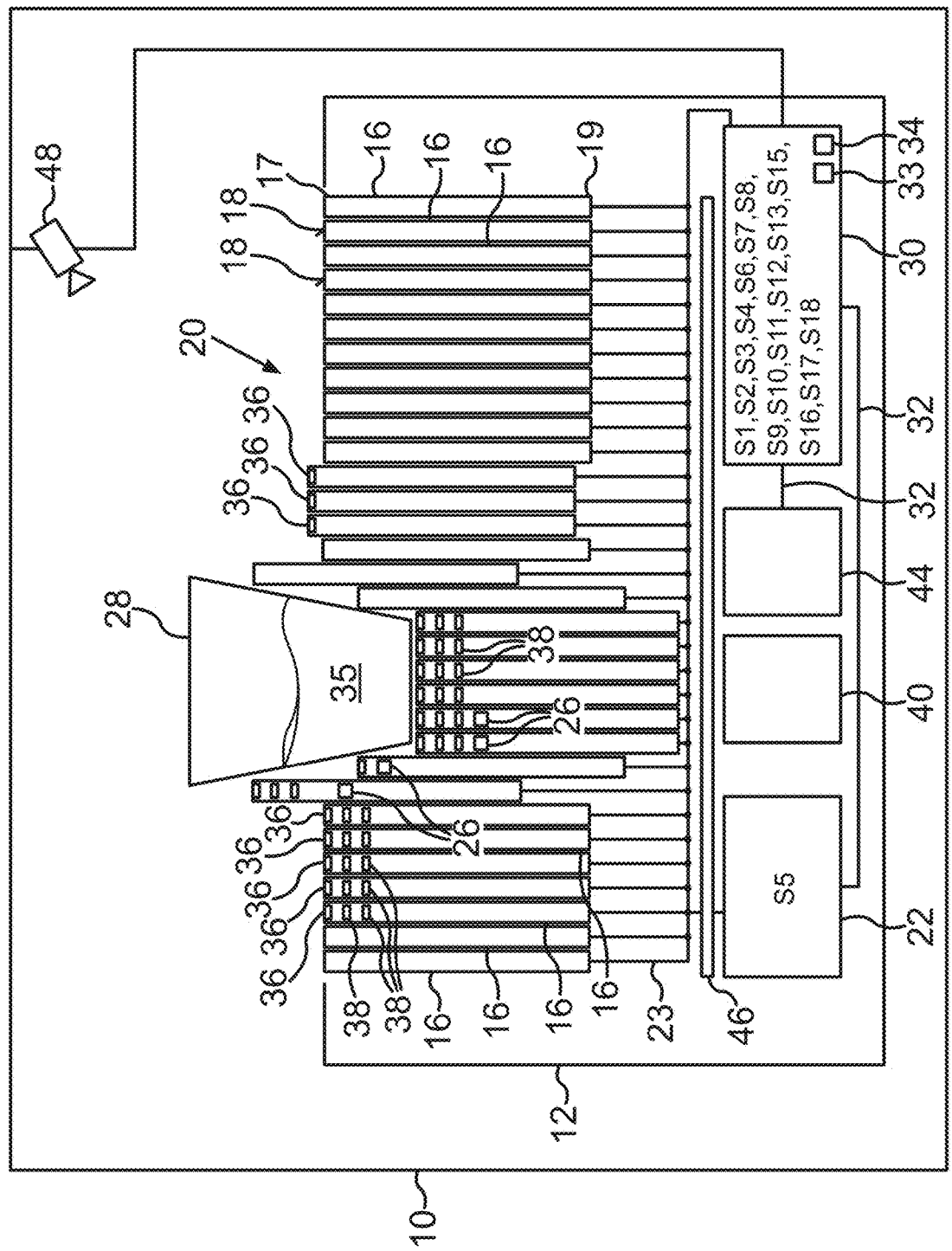
FIG. 1 a schematic view of a first embodiment of the holding device according to the invention and of a first embodiment of the method according to the invention.

The exemplary embodiments explained in the following refer to preferred embodiments of the invention. With the exemplary embodiments, the described components of the embodiments represent individual features of the invention that are to be considered independently of one another, each of which also further develop the invention independently of one another and thus also are to be considered individually or in a combination that is different than the one shown as a component of the invention. Furthermore, the described embodiments can also be supplemented through further described features of the invention.

In the figures, elements which are functionally equivalent are each given the same reference numerals.

FIG. 1 illustrates the principle of the holding device 12 according to the invention by means of a first exemplary embodiment. To this end, FIG. 1 shows a motor vehicle 10, which may be designed, for example, as a passenger car. The holding device 12 may be integrated, for example, in an interior trim element, for example in the center console of the motor vehicle 10, or may form such an interior trim element.

The holding device 12 from FIG. 1 has a plurality of rod elements 16, wherein not all of the rod elements 16 are indicated with reference numeral 16 in FIG. 1 (as well as in the further figures) for the sake of clarity. In the example from FIG. 1, a respective rod element 16 may be designed, for example, as a pin and have a first end 17 and an opposite end 19, wherein a cross-sectional surface 18 of the first end 17 is oriented toward an external region of the holding device 12 such that the cross-sectional surfaces 18 form a holding surface 20. A rod element 16 may have, for example, a length of several centimeters, for example a length in a range of from 0.5 cm to 10 cm, preferably between 0.5 cm and 5 cm. A dimension, for example a diameter, of the cross-sectional surface 18 may amount to 5 mm for example. The rod elements 16 may form preferably a homogenous holding surface 20 with their cross-sectional surfaces 18.

The holding device 12 has an adjustment device 22, which may also be characterized as a setting device. The adjustment device 22 may have, for example, a component with a motor or with technology for raising and lowering the rod elements 16, which is known from the prior art to one skilled in the art, for example by means of a technology that is known from the area of Dynamic Physical Rendering (DPR), a sub-area of research of nanotechnology in convergence with robotics, and involves the process of the dynamic arrangement of intelligent material particles into actually existing macrobodies of any programmable form (programmable matter). The holding device 12 in this case may have such DPR technology for controlling the rod elements 16 as is known to one skilled in the art, for example, from the MIT Media Lab (Tangible Media Group).

FIG. 1 in this case shows a communication device 23, for example an electrical connection from the exemplary motor to the respective rod elements 16. In the example from FIG. 1, the individual rod elements 16 may be adjusted along their main extension axis independently of one another, i.e. moved out of the holding device 12 or lowered into the holding device 12 for example. The adjustment device 22 may optionally have, for example, a matrix arranged under the rod elements 16, said matrix optionally having one or more magnets, preferably a magnet for each of the rod elements 16.

Alternatively or additionally, the respective rod elements 16 may be subjected to pretension, wherein the corresponding rod element 16 can be moved into one of the two directions upon a release of the pretension. Preferably in this case, the adjustment device 22 can be configured to execute a stepless movement of the individual rod elements 16.

Figure 3:
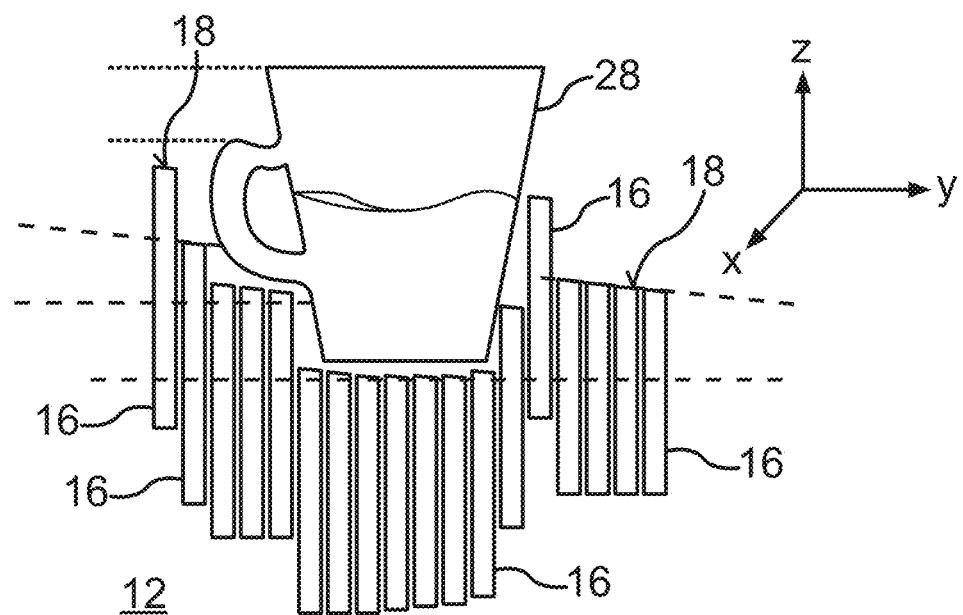
FIG. 3 a schematic view of a further embodiment of the holding device according to the invention and of a first embodiment of the method according to the invention.

To this end, FIG. 3 shows an example of several rod elements 16 arranged next to one another, wherein the individual rod elements 16 can be continuously variably set at different heights by means of a movement into one of the directions indicated by the two arrows. The dashed lines in this case illustrate the different heights of the individual rod elements 16. For the sake of clarity, the further components of the holding device 12 are not shown in FIG. 3.

The dotted lines indicate a height of the object 28 placed in FIG. 3, for example a cup with a handle, as well as the upper base of the handle. FIG. 3 thus illustrates the fit of the holding element, which is provided by the adjusted rod elements 16. The cross-sectional surfaces 18 may extend at an angle, for example, and several cross-sectional surfaces 18 may form a tilted holding surface 20 depending on the height adjustment. Such a tilted cross-sectional surface 18 can be provided, for example, by milling the corresponding rod element 16. FIG. 3 likewise shows a coordinate system, for example, in a system of coordinates of the motor vehicle 10, in which the holding device 12 may be installed for example, wherein the z-axis of a motor vehicle vertical axis may correspond to the x-axis may correspond to a motor vehicle longitudinal axis, and the y-axis may correspond to a motor vehicle transverse axis.

The holding device 12 from FIG. 1 likewise has an optional control unit 30, which may be designed, for example, as a control board, and may optionally have a processor device 33 and/or a data memory 34, wherein a program code for executing the method according to the invention may be stored, for example, in the data memory 34. The processor device in this case may have, for example, several microprocessors and/or microcontrollers.

The control unit 30 may be connected to the adjustment device 42 by means of a data communication connection 32, wherein the data communication connection 32 may be, for example, a wireless or a wired data communication connection 32, for example a WLAN or Bluetooth connection, or a data bus of a data bus system of the motor vehicle 10, for example a CAN bus.

In order to remove the object, for example after switching off a motor or after opening a vehicle door, the rod elements 16, for example, may be raised again in order to help the user in removing the object 28.

FIG. 1 likewise shows some rod elements 16, each having an output device 36, which can be connected to the control unit 30, for example, via a data communication connection (not shown in FIG. 1 for the sake of clarity).

The output device 36 may have, for example, a lighting element, for example an LED or an OLED, and/or a screen, which may have, for example, at least one LED or OLED or may be designed as an LCD screen. The output device 36 may preferably be arranged, for example, on the cross-sectional surface 18. The individual output devices 36 or a totality or part of the output devices 36 can display, for example, a warning or an image. Corresponding information, for example about the temperature of a liquid 35 in the exemplary cup, can be evaluated by the control unit 30, and the control unit 30 can generate, for example, a display signal, which can correspondingly generate the output device 36 or the output devices 36.

Optionally, the output device 36 may have a speaker, which may be arranged, for example, within one of the rod elements 16 or, for example, in a casing of the holding device 12. An acoustic feedback signal, for example an acoustic alert, can be generated by such an output device 36 if it is determined that the object 28 is too hot.

Optionally, haptic feedback, for example vibrating or shaking of some or all rod elements 16 by means of spring-back, can be generated by the rod elements 16. Such haptic feedback can indicate, for example, an increased temperature of the object 28.

The holding device 12 may have a temperature-measuring device 26, which may have one or more components for measuring a temperature known from the prior art to one skilled in the art. For the sake of clarity, such temperature-measuring elements of the temperature-measuring device 26 are only shown in some of the rod elements 16 in FIG. 1, wherein the temperature-measuring element may be, for example, a thermometer. The individual connections of the temperature-measuring device 26 and/or the temperature-measuring elements to the control unit 30 in this case are not shown in FIG. 1.

If the use places the exemplary cup in the holding element, i.e. into the holding cradle or holding base shown by example in FIG. 1, a temperature can be recorded with the assistance of the temperature-measuring device 26. The temperature-measuring device 26 can generate a corresponding signal to the extent that the measured temperature can be described and can transfer the signal to the control unit 30. The control unit 30 can evaluate the signal from the temperature-measuring device 26 and compare the temperature described therein, for example, to a stored target value. If the current temperature of the object 28 exceeds, for example, a target value of 50° C., the control unit 30 generates, for example, a warning signal which may describe, for example, an image of an exclamation point and/or a warning text and/or a corresponding acoustic alert. The signal can then be transferred to the output devices 36 for outputting the signal.

In method step S17, a target value of a temperature, for example, for the liquid 35 may optionally be provided (S17). If the control unit 30 determines, for example by means of geographic coordinates, that the user, for example, has stopped at a café, the probability may be very high that the user has purchased a coffee, and if it is determined, for example, that the user has brought a cup into the motor vehicle 10, the specified target value can be supplied by means of the temperature-control element 38 after placement of the cup (S18).

Alternatively, credit card data may be retrieved, for example, from a data server outside of the motor vehicle. If the user is preferably logged into a user profile of the motor vehicle 10, and it is determined by means of the credit card data that the user has purchased a coffee, the target value can be defined by means of this determination. Alternatively, thermal conductivity, for example, can be determined by means of a material of the object 28, and the target value can be defined by means of the particular thermal conductivity.

The individual output devices 36 from the example in FIG. 1, may generate, for example, a black light, wherein corresponding technologies are known from the prior art. Alternatively or additionally, the output device 36 or the output devices 36 may be designed such that they can be arranged, for example, on a side surface of the respective rod element 16 such that the respective rod element 16 can light up for example. In a further example, the output device 36 may be designed such that a light core or light spot can be emitted on the corresponding cross-sectional surface 18. To this end, a selective light conductor or a light conductor having a selective decoupling point can be arranged within the respective rod element 16, and/or the cross-sectional surface 18 may have, for example, a transcendent film. Alternatively or additionally, the output device 36 may be designed for toggling the exemplary screen from an opaque appearance to a transparent appearance according to technologies from the prior art known to one skilled in the art.

For example, the output devices 36 may be coupled to one another and each have, for example, a pattern, which can form an overall pattern by means of the display of all output devices 36, and this overall pattern may be, for example, a structure of the interior trim element, for example a pattern of a wooden structure.

Figure 4:
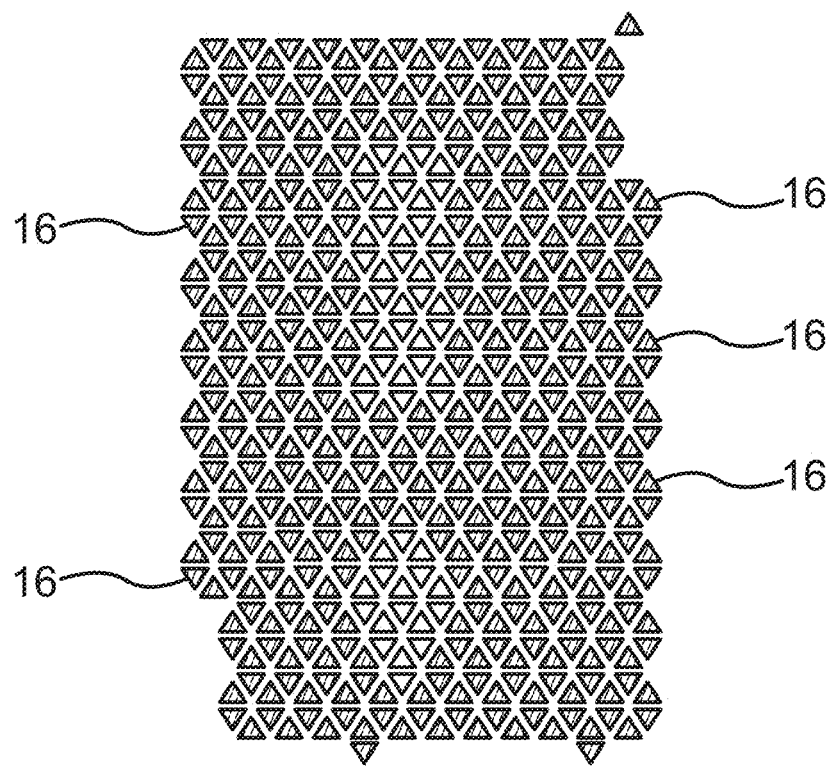
FIG. 4 a schematic view of a further embodiment of the holding device according to the invention and of a first embodiment of the method according to the invention.

FIG. 4 shows exemplary designs and arrangements of rod elements 16, thus the cross-sectional surfaces 18, in one view. In the example of FIG. 4, each of these has, for example, a triangular cross-section and is grouped, wherein the cross-section may alternatively be, for example, round or squared or otherwise polygonal and respectively have an output device 36 with an output element, for example a screen. The rod elements 16 shown in the hatched area may generate, for example, a black light or no light or have a black film on the cross-sectional surface 18, while the rod elements 16 not in the hatched area can generate, for example, a blue light or a white light.

The holding device 12 may optionally have an additional output device 36, which can be arranged, for example, above the holding surface 20 and can be installed, for example, in a corresponding interior trim element. The exemplary output device 36 may have, for example, at least one lighting element, for example a light diode or a bulb. Such an output device 36 can illuminate, for example, the holding element formed by the holding device 12.

It may optionally be provided that output content, which can be generated by a mobile terminal as the object 28, can be projected onto the holding surface 20, for example, via the control unit 30. In this example, the output device 36 can be designed, for example, as a projector and may be arranged above the rod elements 16. Suitable technologies for mirroring a screen content of a mobile terminal, for so-called mirror-link functions, are known from the prior art to one skilled in the art. The holding device 12 from FIG. 2 may be, for example, a holding device 12 shown in FIG. 1 with the corresponding variations described herein.

FIG. 1 shows an optional damping device 46, which may be connected, for example, to the control unit 30 and may have magnets and/or springs, for example, arranged under the rod elements 16, or wherein several or all rod elements 16 may be arranged, for example, over a magnetic surface as a damping device 46. Other exemplary suspension systems are known from the prior art to one skilled in the art.

An optional suction device 44 may have, for example, a pump to generate a vacuum between the rod elements 16. Corresponding components are known from the prior art to one skilled in the art. Optionally, each of the rod elements 16 or a part of the rod elements 16 may be designed as hollow, that is designed, for example, as tubes, wherein a vacuum can then be created through the interior of the tubes. A strength of the vacuum may depend, for example, on a material of the object 28. For example, less vacuum can be generated, for example, upon placement of a monetary bill or coins than upon placement of a cup.

FIG. 1 likewise shows an optional temperature-control unit 40 with at least one temperature-control element 38, which may be arranged, for example, in a rod element 16. The temperature-control unit 40 may have, for example, a control chip configured for the function thereof. In the example from FIG. 1, two temperature-control elements 38 are shown by example in some of the rod elements 16, wherein one of the temperature-control elements 38 may be, for example, an element for heating the rod elements 16 and/or the cross-sectional surface 18, for example a heating spiral, and a further temperature-control element 38, which may be designed for cooling the rod element 16 and/or the cross-sectional surface 18, for example a Peltier element. Alternatively, the corresponding rod element 16, for example, may only have one temperature-control element that may be designed, for example, for both heating and cooling the rod element 16 and/or the cross-sectional surface 18. These are only shown by example in some of the rod elements 16, also in reference to the temperature-control elements 38, and only some of the temperature-control elements 38 are characterized with reference numerals.

Figure 2:
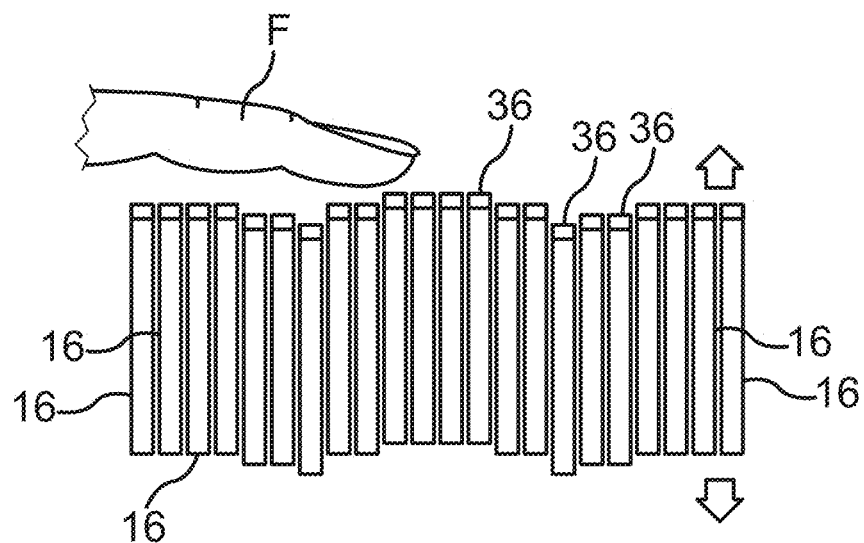
FIG. 2 a schematic view of a further embodiment of the holding device according to the invention and of a first embodiment of the method according to the invention.

The rod elements 16 may optionally be designed, for example, as a button element (see FIG. 2), and, to this end, have a capacitive proximity sensor and/or a touch-sensitive output device 36, for example a touchscreen. FIG. 2 shows an example of how a finger F approaches the rod elements 16. Via the previously mentioned mirror link function, a display content of a placed mobile terminal, for example, can be generated by means of the output device 36 of the rod elements 16 and assigned with a corresponding function. In other words, some of the output devices 36 can display functions of the exemplary mobile terminal and these functions can be triggered by means of operating, i.e. touching, approaching, or pressing, for example, the corresponding rod element 16.

FIG. 1 further shows the principle of the method according to the invention by means of an exemplary embodiment. In method step S1, the control unit 36 determines a form of an object 28, for example a cup, that a user of the motor vehicle 10 brings into the interior. To this end, the control unit 30, for example, may receive a sensor signal from a sensor device 48, which may have, for example, a camera or a scanner, wherein the sensor signal can describe, for example, a camera image or scanner image, on which the object 28 may be recorded.

An exemplary scanner of a sensor device 48 may be arranged, for example, in the center console or in an armrest, and the user can, for example, initially place the object 28 on the scanner or OLED screen. Alternatively, the sensor device 48 may be arranged, for example, in a headliner or a doorframe and, for example, record, i.e. scan, all objects located, for example, in the hand of the user or in a pants pocket of the user when the user enters the vehicle. Suitable exemplary scanners are known from the prior art to one skilled in the art. Suitable technologies are currently being used in airports to scan objects in carry-on baggage. Optionally, the sensor device 48 may record, for example, as soon as the object 28 has been taken back out of the motor vehicle 10.

For example, the control unit 30 can determine a model or material of the object 28 via a wireless connection or Internet connection and by means of the sensor signal, for example, by querying corresponding information from a data server on the Internet (S2). Alternatively, the exemplary camera or scanner image can be evaluated, for example, with the assistance of image analysis software, wherein there can be differentiation, for example, between a handbag, a person, and the object 28. Information regarding a material or dimensions of the recorded object 28 can be retrieved, for example, from a data server outside of the motor vehicle.

In method step S3, a position for holding the object 28 can be determined, which may depend, for example, on whether a user of the motor vehicle is sitting very far forward or very far rearward, or has long arms for example. In other words, a criterion for the position of the holding element may be that the object 28 should be easily reachable after placement.

The holding surface form default signal generated by the control unit 30 in method step S4 can then describe, for example, the exemplary armrest as a preferred holding device 12, which describes the form of a lower part of the exemplary cup as a holding element and a position further forward on the holding surface 20. In order to form the holding element (S5), which can be formed in FIG. 1 by the lowered rod elements 16 and designed as a charging cradle or charging base, the adjustment device 22 can shift the rod elements 16, which are shown lowered in FIG. 1, downward by one centimeter or by two centimeters, for example. This lowering can be described by the generated holding area form default signal, which may describe a precise instruction, for example by means of coordinates of the individual rod elements 16 to be lowered, as to which of the rod elements 16 of the holding device 12 should be adjusted. In order to transfer the holding area form default signal (S6), it can be transmitted to the adjustment device 22 via the exemplary data bus.

The position of the holding element and thus the holding position of the object 28 can be shifted on the holding element, for example after placement of the object 28, in which some of the rod elements 16 are lifted, for example, on one side of the object 28, while some of the rod elements 16 are lowered on another side of the object 28. The ascending rod elements 16 exert a compressive force onto the one end of the object 28, and the descending rod elements 16 on the other end of the object 28 no longer form any resistance such that the object 28 slides in the direction of the descending rod elements 16 and changes its position.

This can occur, for example, if the user shifts the body posture or body position or, for example, the vehicle seat. The position or location change (S7) can be determined, for example, with the assistance of the signal from the sensor device 48, regarding which the control unit 30 may have, for example, software to determine body posture. In order to adjust the current position of the holding element (S8), a readout can occur, for example, as to which of the rod elements 16 are being lowered. In order to determine a suitable, alternative position (S9), coordinates of the holding surface 20 can be compared, for example, to a coordinate system of an interior of the motor vehicle 10, wherein the coordinates at which the body of the user is situated may also be described, for example, in the coordinate system. In order to determine the alternative position, the corresponding coordinates can then be compared to one another for example.

In order to position the holding element, the control unit 30 can then generate a further holding area form default signal (S10), which can describe the new holding position. This further holding area form default signal can also be transferred (S11) to the adjustment device 22.

Such a shifting of the object 28 can also occur, for example, as a function of a gesture or an operational act of the user, for example if the user brings the object 28 closer or further away with the hand. Suitable technologies for detecting gestures, for example by means of the sensor device 48, are known from the prior art to one skilled in the art.

In order to display the holding element, i.e. the exemplary holding cradle or holding base, a corresponding lighting signal can be generated (S12), which can be transferred (S13) to the output device 36. The exemplary lighting of the holding element/or the holding surface 20 by a lighting device with a lighting element has already been previously described (see FIG. 2, method step S14) as has the optional displaying of display content (S15) by one or more output devices 36.

As a whole, the examples illustrate how an intelligent and attractive holding device 12, i.e. a retaining system, can be provided by the invention by means of an intelligent rod element design, for example by means of an intelligent rod design.

According to a further exemplary embodiment, an intelligent and adaptive holding device 12, i.e. an intelligent and attractive retaining system, can be enabled, for example, with an intelligent rod design; an object 28 or objects 28, which reach the motor vehicle 10, are recorded beforehand, for example registered or scanned. For example, a geometric form comparison and/or data comparison with all available sources can preferably take place in real time. In other words, it can be determined what the user brings into the motor vehicle 10, for example a mobile terminal, a key, a cup, and what form, for example, the exemplary cup has, for example with or without handle, or what manufacturer it relates to or what material, whether the material is heat-conducting, whether and/or which liquid may be in the exemplary cup, and whether the liquid, for example, may be boiling hot or cold.

Optionally, a cone of light and/or a projection or the rod elements 16 themselves can light up with the assistance of the previously described output device 36 and thereby indicate where the object 28 can best be stowed. Accordingly, the rod elements 16, which may preferably be designed as rods, may lower or raise, for example by a particular amount, in order to indicate where the object 28 can be placed. A contour and fit of the rod elements 16 ideally fits optimally to the object 28 and thus provides precision, efficiency, flexibility, and intelligence of the system.

The user can then place the object 28 into the thusly depicted holding element, and the rod elements 16 can preferably enclose the object 28 such that it is retained in the best possible manner.

If the user changes position or activity, for example, in the motor vehicle 10, or if the stowed object 28 changes, for example if the liquid 35 cools down, the rod element 16 can preferably respond independently and heat and maintain the liquid 35, for example, at the desired, drinkable temperature. Optionally, sensors of the sensor device 48 can detect each change in the motor vehicle 10 and autonomously estimate whether, for example, a change in the sitting position can have an impact on the placed object 28. If the user moves rearward for example, the rod elements 16 can also move the object 28 in order to always enable a better or the most optimum interaction position.

The rod elements 16 may optionally each have an output device 36 and be equipped, for example, with one OLED screen each, which can form a large display and interaction surface depending on use. For example, they can create physical buttons with a display such that the user, for example, can experience true haptic feedback upon activation, for example a lowering of the rod elements 16. Another words, the rod elements 16, which may be characterized, for example, as display rods in this example, can connect or couple, optionally depending on the digital scope and/or size of the retrieved information.

This results in the aforementioned advantages, and the previously described disadvantages can be reduced or eliminated. A non-stationary holding and retaining system is provided. This results in a high degree of flexibility, because the holding device 12 adapts itself to the requirements and the physical changes of the user. In addition, an adaptation of the holding or retaining surface, i.e. of the holding surface 20, to different objects 28 is possible with respect to the form and design. In addition, the holding device 12 according to the invention is very decorative.

According to a further exemplary embodiment, a technical implementation, for example, may mean that interior monitoring, for example with the assistance of the sensor device 48, can determine what object 28 or what objects 28, optionally even what user, are entering the motor vehicle 10 and what the user is currently doing. Data can be processed in real time. Large surfaces in the motor vehicle 10 can be provided with the intelligent rod elements 16, which may be designed, for example, as pins or rods. Individually controllable rod elements 16 may be spring-mounted for example, and each equipped, for example, with an OLED screen. Alternatively or additionally, individually controllable rod elements 16 may be provided with a light conductor, which can light up itself, for example, or through the material. Individual rod elements 16 may each be provided, for example, with a heating spiral for heating the object 28. Other rod elements 16 may provide cooling for example.

The invention claimed is:

1. A holding device for a motor vehicle, comprising:
   at least one rod element, which has a first end with a cross-sectional surface, which forms a part of a holding surface of the holding device, and wherein a main extension axis of the at least one rod element intersects the part of the holding surface such that a second end, opposite the first end, of the at least one rod element is facing away from the part of the holding surface and protrudes into the holding device; and
   an adjustment device configured to receive a holding surface form default signal for adjusting the at least one rod element along the main extension direction in order to change a form of the holding surface.

2. The holding device according to claim 1, further comprising:
   an output device arranged on one or both of in the first end of the at least one rod element and on the cross-sectional surface of the first end of the at least one rod element.

3. The holding device according to claim 1, further comprising:
a plurality of rod elements, wherein each of the rod elements is arranged to be adjustable along its respective main extension axis, and wherein the respective cross-sectional surfaces form a part of the holding surface; wherein the adjustment device is configured to adjust a part of the plurality of rod elements or each of the rod elements.

4. The holding device according to claim 1, further comprising:
a damping device for damping a force acting on the at least one rod element.

5. The holding device according to claim 1, further comprising:
a suction device for creating a vacuum on the holding surface.

6. The holding device according to claim 1, further comprising one or both of:
a temperature-measuring device; and
a temperature-control element for one or both of heating and cooling of one or both of the at least one rod element and of the first end of the at least one rod element;
wherein one or both of the temperature-measuring device and the temperature-control element is arranged in or on the at least one rod element.

7. A method for operating a holding device of an interior trim element of the motor vehicle, wherein the following steps are executed by a control device:
determining a form of an object, which is situated in an interior of the motor vehicle;
determining a position on the holding device suitable for holding the object;
generating a holding surface form default signal, which describes an adjustment of at least one rod element of the holding device along its main extension direction, as a function of the determined form of the object and the determined position, such that the part of the holding surface, which is formed by a totality of cross-sectional surfaces, forms a holding element, which is at least partially fitted to the determined form, in the determined position; and
transferring the generated holding surface form default signal to the adjustment device of the holding device in order to adjust the at least one rod element, and thereby form the holding element.

8. The method according to claim 7, further comprising:
Determining one or both of a biometric parameter of a user and a sitting position of the user of the motor vehicle; wherein the position on the holding device that is suitable for holding the object is determined as a function of the determined biometric parameter of the user.

9. The method according to any of claim 7, further comprising:
determining a position or location change of a body of the user;
determining a current position of the holding element;
determining an alternative position of the holding element, in which the object stored in the holding element is more easily accessible to the user from one or both of the changed body position and body location, as a function of the determined position and/or location change;
generating a further holding surface form default signal, which describes an adjustment of a plurality of rod elements for moving the holding element from the current position into the determined alternative position; and
transferring the further holding surface form default signal to the adjustment device.

10. The method according to claim 7 for operating a holding device, further comprising:
defining a target value of a temperature of a content of the object; and
setting the defined target value by the temperature-control element of the holding device;
wherein the defining of the target value depends on one or both of a determined material of the object and a property of the determined object.

11. The method according to claim 7, further comprising:
generating a lighting signal, which describes a lighting of the holding element by a display content to be displayed or by light, as a function of one or both of the determined suitable position on the holding device and a position of the holding element; and
transferring the generated lighting signal to an output device of the holding device for one or more of a) controlling the output device of the at least one rod element; and b) controlling a lighting element that impacts the at least one rod element with light.

12. A control device, having a processor device, wherein the control device is configured to execute the process steps of:
determining a form of an object, which is situated in an interior of the motor vehicle;
determining a position on the holding device suitable for holding the object;
generating a holding surface form default signal, which describes an adjustment of at least one rod element of the holding device along its main extension direction, as a function of the determined form of the object and the determined position, such that the part of the holding surface, which is formed by a totality of cross-sectional surfaces, forms a holding element, which is at least partially fitted to the determined form, in the determined position; and
transferring the generated holding surface form default signal to the adjustment device of the holding device in order to adjust the at least one rod element, and thereby form the holding element.

13. The holding device according to claim 1, wherein the holding device has a control device configured to execute process steps affecting the control device, wherein the following steps are executed by the control device:
determining a form of an object, which is situated in an interior of the motor vehicle;
determining a position on the holding device suitable for holding the object;
generating the holding surface form default signal, which describes an adjustment of at least one rod element of the holding device along its main extension direction, as a function of the determined form of the object and the determined position, such that the part of the holding surface, which is formed by a totality of cross-sectional surfaces, forms a holding element, which is at least partially fitted to the determined form, in the determined position; and
transferring the generated holding surface form default signal to the adjustment device of the holding device in order to adjust the at least one rod element, and thereby form the holding element.

14. The holding device according to claim 2, wherein the output device includes one or more of a lighting element, a screen, and a speaker.

15. The holding device of claim 3, wherein the adjustment device is configured to adjust each of the rod elements independently of the other rod elements.

* * * * *